United States Patent [19]
Führing

[11] 4,074,984
[45] Feb. 21, 1978

[54] SOLVENT-RECOVERY SYSTEM

[75] Inventor: Heinrich Führing, Augsburg, Germany

[73] Assignee: Böwe Böhler & Weber Maschinenfabrik, Augsburg, Germany

[21] Appl. No.: 688,894

[22] Filed: May 21, 1976

[30] Foreign Application Priority Data

May 24, 1975 Germany ............................. 2523079

[51] Int. Cl.² ........................................... B01D 53/04
[52] U.S. Cl. ....................................... 55/163; 55/179
[58] Field of Search ................... 55/33, 62, 74, 162, 55/163, 179, 387

[56] References Cited
U.S. PATENT DOCUMENTS

| | | | |
|---|---|---|---|
| 2,428,885 | 10/1947 | Luaces | 55/179 X |
| 3,016,978 | 1/1962 | Hull | 55/179 |
| 3,531,916 | 10/1970 | Kulperger et al. | 55/33 |
| 3,740,928 | 6/1973 | Schmid | 55/179 |
| 3,766,713 | 10/1973 | Leonard | 55/163 X |
| 3,883,325 | 5/1975 | Fuhring et al. | 55/179 X |
| 3,955,946 | 5/1976 | Fuhring et al. | 55/179 |

*Primary Examiner*—John Adee
*Assistant Examiner*—Robert H. Spitzer
*Attorney, Agent, or Firm*—Karl F. Ross

[57] ABSTRACT

In order to recover an organic solvent from an airstream blown through one or more treatment units such as dry-cleaning machines, two adsorbers filled with activated charcoal are alternately connected between an incoming duct and an outgoing duct in series with a blower, a normally inactive air heater upstream of the adsorbers and a normally inactive air dryer downstream of the adsorbers. A programmer periodically reverses two switchover valves for passing the airstream through one or the other adsorber in respective half-cycles during which steam is blown through the inactive adsorber for regenerating its active mass. If no treatment unit requires solvent removal, the continuously circulating airstream is returned from the dryer outlet to the heater inlet through an otherwise closed bypass controlled by a valve in response to changes in duct pressure or to a switching signal from a treatment unit. At the beginning of each half-cycle, the programmer briefly activates the air heater and the air dryer to clear the newly regenerated adsorber of residual moisture; the activation command from the programmer may override a switching signal from the pressure sensor or from a treatment unit to let the drying airstream circulate through the bypass.

11 Claims, 4 Drawing Figures

SOLVENT-RECOVERY SYSTEM

FIELD OF THE INVENTION

My present invention relates to a system for the recovery of organic solvent from one or more treatment units intermittently using such solvent, e.g. dry-cleaning machines for textiles, furs, leather and the like or tumblers for the degreasing of metallic articles.

BACKGROUND OF THE INVENTION

In the dry-cleaning industry it is known to recover organic solvents by passing an airstream through a rotating drum or cage containing the load to be cleaned, the solvent-laden air then traversing an adsorber filled with a suitable mass such as activated charcoal. When the adsorption capacity of the mass has been reached, the airstream is switched to a previously inactive second adsorber while the first one is being regenerated with the aid of steam passing through the charcoal bed. Reference in this connection may be made to U.S. Pat. Nos. 2,777,534 and 2,910,137; a particularly advantageous adsorber is shown in commonly owned U.S. Pat. No. 3,955,946.

Because of the relative complexity and high cost of such adsorbers and their associated regenerating equipment, it is uneconomical to provide an individual solvent-recovery system of this type for each of several dry-cleaning machines or other treatment units of a single plant. If a single pair of alternately activated adsorbers is to serve a plurality of such units, conventional techniques therefore call for the use of adsorbers of sufficient capacity to handle the combined solvent volume from all these units if they happen to operate simultaneously. Since, however, the operating periods of such units are independent of one another, it may happen that an active adsorber must keep operating without pause during a succession of overlapping solvent-recovering periods of the several units. As the amount of circulating solvent varies with the number of units connected in parallel to the inlet of the active adsorber, there is no simple way of determining when the capacity of the adsorber is reached and a switchover to the previously regenerated alternate adsorber is to be carried out.

OBJECTS OF THE INVENTION

The general object of my present invention, therefore, is to provide an improved solvent-recovery system designed to serve several treatment units with the aid of two adsorbers of small capacity which are relatively inexpensive and can be rapidly regenerated.

Another object is to provide means in such a system for insuring a more efficient recovery of solvent from an airstream.

SUMMARY OF THE INVENTION

In accordance with my present invention, an incoming duct carrying solvent-laden air from a plurality of treatment units of a dry-cleaning or other plant and an outgoing duct delivering substantially clean air to these units are interconnected by conduit means forming an air-circulating loop therewith, this loop including a blower which generates a continuous airflow. The loop includes a normally inactive air heater at an upstream location and a normally inactive air dryer at a downstream location. Between these locations two substantially identical solvent adsorbers are alternately insertable in the loop with the aid of first valve means controlled by a programmer whose recurrent operating cycle is divided into alternate active and inactive half-cycles for each adsorber, this programmer being independent of the treatment unit or units served by the system. During the inactive half-cycle of each adsorber, which of course corresponds to the active half-cycle of its mate, that adsorber is connected by second valve means—also under the control of the programmer—in a regenerating circuit for the retrieval of previously accumulated solvent with the aid of steam from a suitable source as is well known per se. The two normally inactive components upstream and downstream of the active adsorber, i.e. the air heater and the air dryer, are provided with energy-supply means controlled by the programmer for activating these components during an initial portion of each half-cycle to expel residual moisture from the adsorber regenerated in the previous half-cycle. Thus, the air entering the adsorber at this stage is preheated to pick up that moisture and is then cooled in the dryer before entering the outgoing duct. In order to recirculate this air through the adsorber even if none of the units in the associated treatment plant is in its solvent-exhaust phase, a bypass from the dryer outlet to the heater inlet is established with the aid of third valve means under the control of the treatment unit or units whenever passage to these units is temporarily blocked. Thus, an excessive pressure buildup in the outgoing duct is avoided.

The establishment of the bypass by the third valve means may be controlled by the treatment unit or units either directly, with the aid of a signal emitted by an associated timer, or indirectly by a switching device responsive to significant pressure changes in either or both ducts. The return of this flow of drying air to a treatment unit currently in its solvent-exhaust phase may be prevented, in either of these instances, by an overriding command from the programmer which causes the bypass to be opened and the flow path to the treatment unit or units to be blocked during the heating and drying period regardless of the operating phases of these units. For this purpose the third valve means is advantageously designed as a two-way valve connecting the outgoing duct either to an extension leading to the treatment units or to the incoming duct just ahead of the air heater.

The blower circulating the air either through the complete loop or through the bypass path could be located either upstream or downstream of the active adsorber. A downstream connection is preferred especially in the case where the bypass valve is controlled by a pressure sensor located in the aforementioned extension of the outgoing duct.

BRIEF DESCRIPTION OF THE DRAWING

The above and other features of my invention will now be described in detail with reference to the accompanying drawing in which.

SPECIFIC DESCRIPTION

Figure 1:
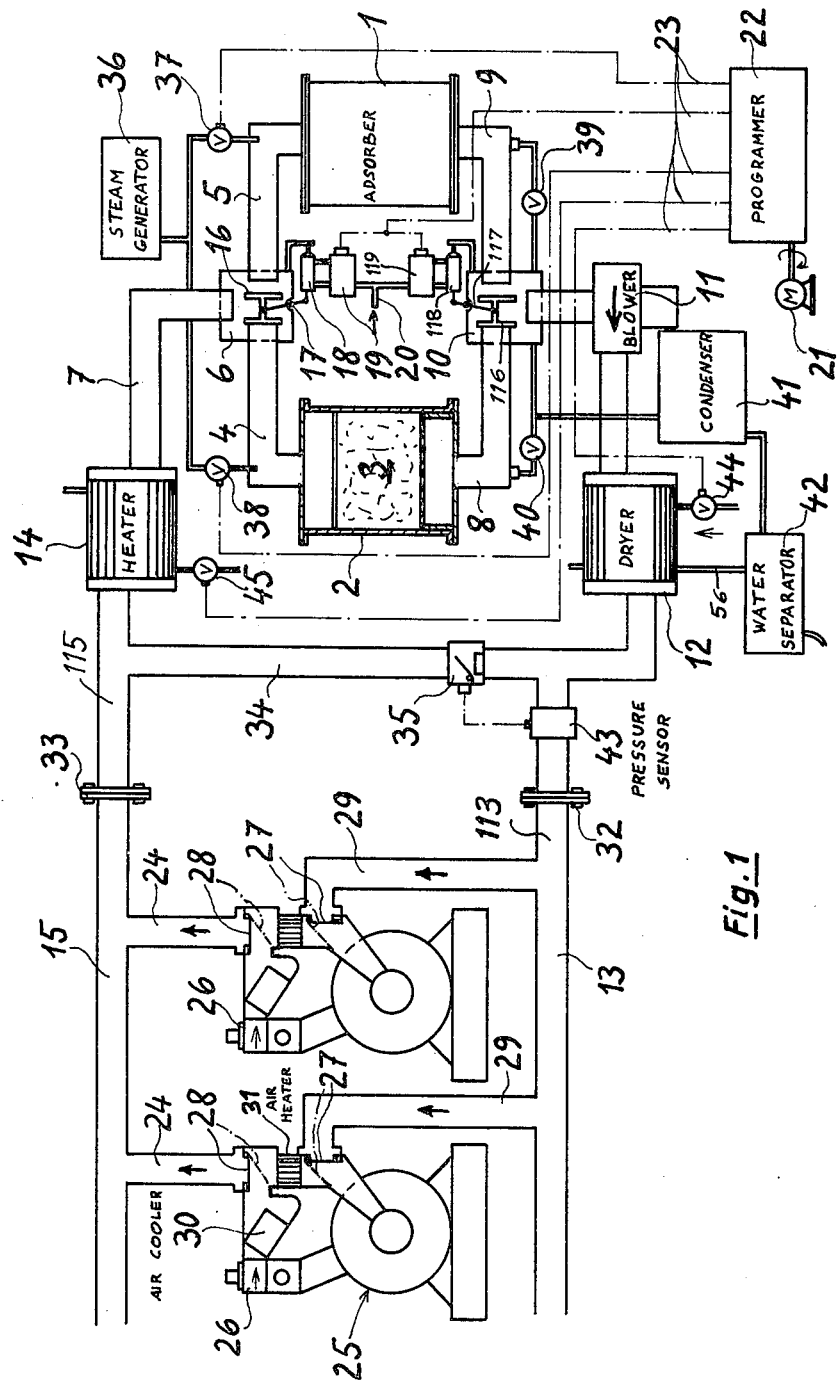
FIG. 1 is a somewhat diagrammatic representation of a solvent-recovery system according to my invention.

In FIG. 1 I have shown a solvent-recovery system for a plant with a plurality of treatment units 25 each constituted by a dry-cleaning machine of conventional type. Organic solvent, e.g. perchloroethylene, permeates a load of textiles or the like during a cleaning phase and is extracted during an exhaust phase. The introduction and removal of solvent is determined by a timer 50 (FIG. 3) individual to each machine, this timer controlling switchover means in the form of a pair of flags 27, 28 establishing in their solid-line positions a condition in which the solvent vapors can be continuously recirculated through a rotating drum in the machine via a closed circuit including a local blower 26, an air cooler 30 and an air heater 31; part of the spent solvent may be extracted from the circuit, in a preliminary drying operation at the end of a working phase, between cooler 30 and heater 31. For a more or less complete removal of residual solvent from the load, flaps 27 and 28 are moved into their alternative positions (dot-dash lines) to establish a recovery phase in which fresh air can enter each machine from an inlet manifold 13 through a branch conduit 29 and leave via another branch conduit 24 and an outlet manifold 15. The circulating air is supplied from and returned to a solvent-recovery system, according to my invention, provided with an outgoing duct 113 and an incoming duct 115 which are connected with manifolds 13 and 15 by way of respective couplings 32 and 33. A conduit 34 forms a bypass path between ducts 113 and 115.

Incoming duct 115 opens into an air heater 14 which is normally inactive but can be activated by the passage of a heating fluid therethrough upon the opening of a valve 45 controlled by a programmer 22. This programmer, driven independently of the units 25 by a motor 21, also controls a valve 44 permitting the passage of a cooling fluid through a normally inactive air dryer 12 connected to outgoing duct 113. A conduit 7 extends from heater 14 to a switchover valve 6 designed to connect this conduit with either an inlet port 4 of an adsorber 2 or an inlet port 5 of a substantially identical adsorber 1; each of these adsorbers has a housing containing a bed of activated charcoal 3. An outlet port 8 of adsorber 2 and an outlet port 9 of adsorber 1 are alternately connectable to a blower 11, working into dryer 12, by means of a switchover valve 10 ganged with valve 6. The two valves 6, 10 are pneumatically actuated via a pipe 20 and respective pressure cylinders 18, 118 by way of respective solenoid valves 19 and 119 controlled by the programmer 22. The pistons of cylinders 18 and 118 act on the bodies 16 and 116 of valves 6 and 10 through a pair of levers 17 and 117.

A regenerating circuit for adsorbers 1 and 2 comprises a steam generator 36 alternately supplying the inlet ports 4 and 5 by way of respective valves 38 and 37 also controlled by the programmer. The spent steam, collected in outlet port 8 or 9, is delivered via a valve 40 or 39 to a condenser 41 and thence to a water separator 42 which is also connected to a drain 56 emanating from dryer 12. During the regeneration phase, solvent precipitated with the water from the circulating airstream in dryer 12 is recovered from the water separator 42 in a manner well known per se. Valves 39 and 40 are operated by programmer 22, in synchronism with valves 37 and 38, by way of conductors 23 indicated in dot-dash lines.

A further valve 35 in bypass line 34 is controlled by a pressure sensor 43 in duct 113 which holds the valve 35 closed as long as the pressure in line 13, 113 is relatively low, indicating that an open flow path exists between manifolds 13 and 15 through at least one of the machines 25 past its flaps 27 and 28. As long as none of the machines 25 is in its exhaust phase, sensor 43 opens the bypass path 34 and lets the continuously operating blower 11 drive the air through dryer 12, heater 14 and the momentarily active adsorber (e.g. 1) in a foreshortened circuit excluding the machines 25. When the timer at one of these machines reverses the flaps 27 and 28, the pressure drops sharply in duct 113 and sensor 43 closes the valve 35 whereupon air may circulate through conduit 29, the rotating vessel of the machine and conduit 24 back to duct 115 and continue via heater 14 and the active adsorber back to the blower. After a certain time interval, corresponding to half an operating cycle of programmer 22, valves 6 and 10 are switched to activate the other adsorber (2) and deactivate the adsorber previously used which can now be regenerated with steam from source 36. Sucn an operating cycle may be substantially shorter than a treatment phase or an exhaust phase of any machine 25.

Figure 4:
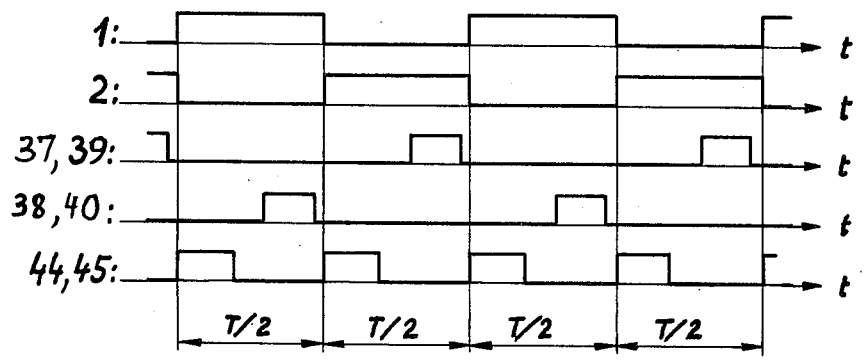
FIG. 4 is a time diagram relating to the operation of the system of FIG. 1.

FIG. 4 illustrates the operation of the system of FIG. 1 under the control of programmer 22. Thus, in a first half-cycle T/2 the adsorber 1 is active, valve bodies 16 and 116 occupying the position illustrated in FIG. 1. In an initial portion of this half-cycle, valves 44 and 45 are opened to activate the heater 14 and the dryer 12; this lets preheated air circulate through the adsorber 1 for the purpose of picking up residual moisture from its charcoal bed which was previously regenerated by the passage of steam therethrough. With the half-cycle T/2 lasting several minutes, this drying phase (during which the air circulates repeatedly through the adsorber) may be completed in 30 to 60 seconds in view of the relatively small adsorber capacity. Later in the same half-cycle, valves 38 and 40 are opened to let steam pass through the inactive adsorber 2 and extract the previously accumulated solvent therefrom. Immediately after the next switchover, with valves 6 and 10 moving into their alternate position to activate the adsorber 2, this adsorber is subjected to the aforedescribed drying operation as valves 44 and 45 are again briefly reopened to activate the heater 14 and the dryer 12. Later in this second half-cycle, valves 37 and 39 are opened to regenerate the now inactive adsorber 1.

Figure 2:
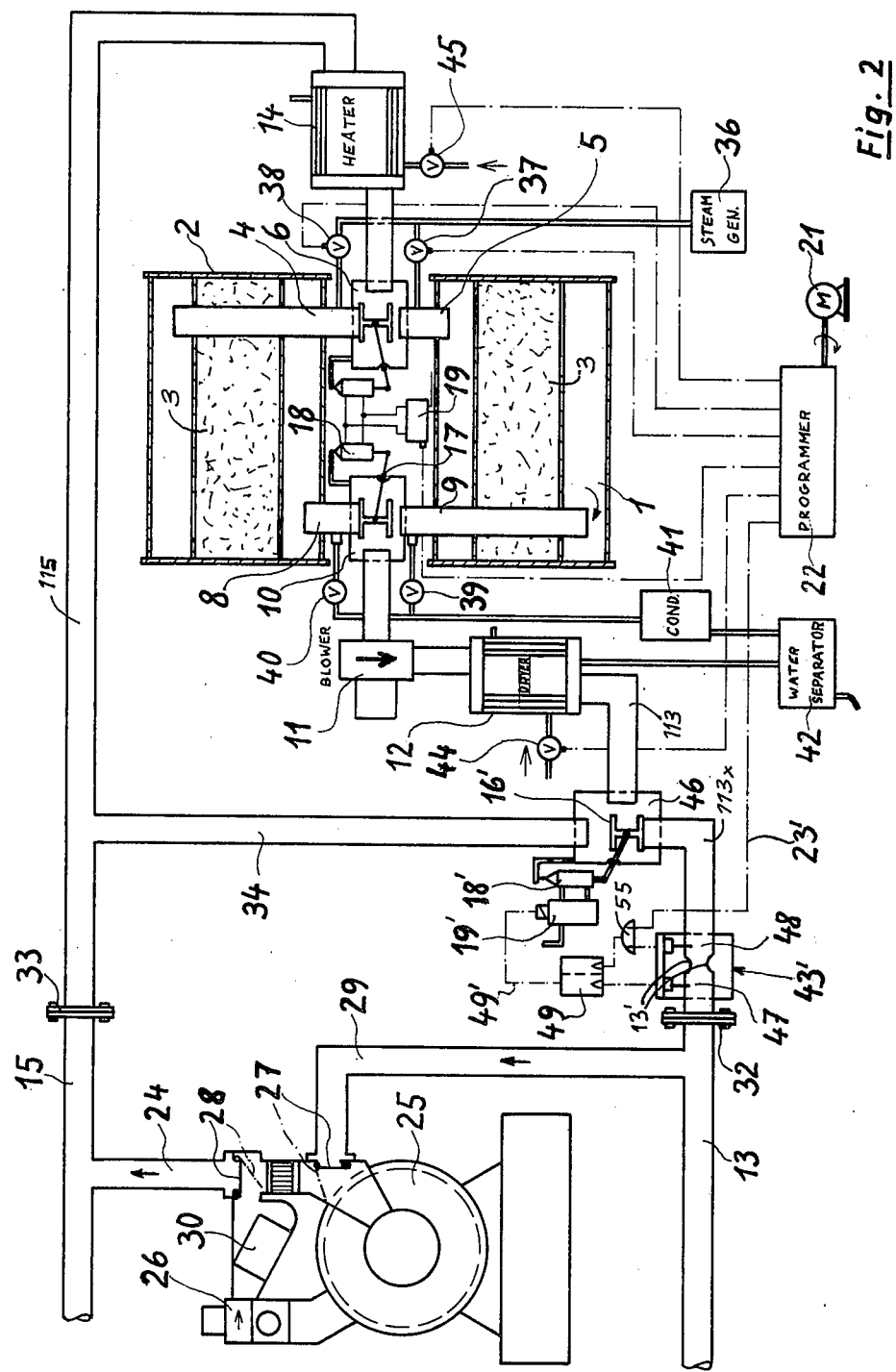
FIG. 2 is a view similar to FIG. 1, showing another embodiment.

In FIG. 2 I have shown a system generally similar to that of FIG. 1 in which corresponding elements have been designated by the same reference characters. In this case the housings of the two adsorbers 1 and 2 are closely juxtaposed and have their respective inlet and outlet ports 5, 9 and 4, 8 mounted on confronting surfaces. Ports 4 and 9, accordingly, are longer than ports 5 and 8, projecting through the respective adsorber beds 3. The switchover valves 6 and 10 are disposed between these confronting surfaces and from a compact structural unit with these ports from which the adsorber housings can be conveniently detached.

The outgoing duct 113 is here shown provided with an extension 113x terminating in the coupling 32. A pressure sensor 43' straddles a constriction 13' of extension 113x and comprises two gauges 47 and 48 downstream and upstream of that constriction, respectively. Gauge 47 has a binary electrical output energizing a setting input of a flip-flop 49 whenever the pressure in manifold 13 falls to a relatively low value, e.g. substantially below the ambient level; gauge 48 similarly energizes, through an OR gate 55, a resetting input of flip-flop 49 whenever the pressure in extension 113x attains a relatively high value, e.g. substantially above ambient. Another input of OR gate 55 is connected to an output lead 23' of programmer 22. The set output 49' of the flip-flop, when energized, actuates a solenoid valve 19' to pressurize a cylinder 18' for the displacement of the body 16' of a valve 46, similar to valves 6 and 10 of FIG. 1, from its illustrated position blocking the extension 113x to its alternate position obstructing the bypass 34.

In the illustrated position of valve 46, duct 113 communicates directly with duct 115 by way of conduit 34 and allows the circulation of drying air through the foreshortened loop as described above. None of this air can reach the duct 13 leading to the machine or machines 25 whose flaps 27 and 28 are in their normal position represented by solid lines.

Upon the reversal of the flaps 27, 28 of any machine, the suction side of blower 11 is connected through the active adsorber and the line 115, 15 to manifold 13 so that the pressure drops downstream of constriction 13' and causes the gauge 47 to set the flip-flop 49. The resulting shifting of valve body 16' connects duct 113x to manifold 13 and blocks the bypass 34, letting air circulate repeatedly through the machine or machines that are in their solvent-exhaust phases.

Upon the termination of these exhaust phases in all the machines, pressure builds up again in line 113, 113x, 13 and actuates the gauge 48 which thereupon resets the flip-flop 49, returning the valve 46 to its illustrated position.

At the beginning of each half-cycle T/2 (FIG. 4), i.e. concurrently with the opening of valves 44, 45, programmer lead 23' is energized to reset the flip-flop 49 if it was previously set. This command from the programmer 22 overrides any output signal of gauge 47 that may exist at that time; thus, the bypass 34 is open during the drying phase and the air leaving the dryer 12 is directly returned to the heater 14 without reaching the machines 25.

Figure 3:
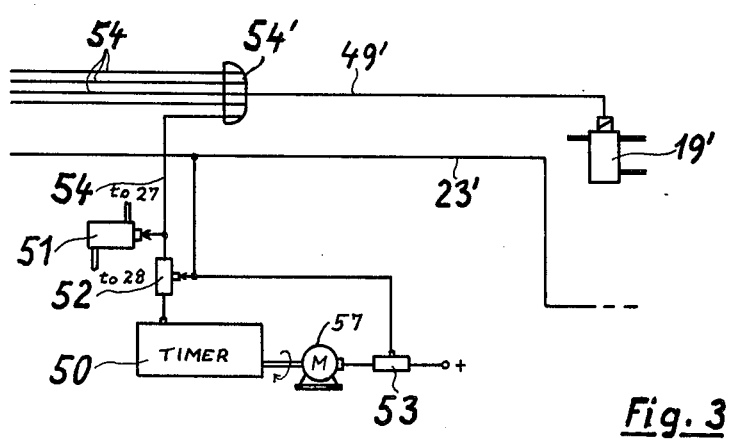
FIG. 3 illustrates a partial modification of the system of FIG. 2.

In FIG. 3 I have shown an alternative way of controlling the operation of the bypass valve 46 of FIG. 2 by means of solenoid 19'. The timer 50 of a machine 25, normally driven by a motor 57, marks the start of the solvent-exhaust phase by energizing a solenoid 51 via a lead 54, this solenoid reversing the position of flaps 27 and 28 shown in FIG. 2. Lead 54 terminates at an OR gate 54', together with corresponding leads from other machines 25, this OR gate having an output lead 49' whose energization actuates the solenoid 19'. A circuit breaker 52 in lead 54 is controlled by the programmer lead 23' to de-energize the solenoid 51 during the drying phase established by the programmer, i.e. during the initial portion of each half-cycle T/2 coinciding with the opening of valves 44 and 45. At the same time the motor 57 is disconnected from its power supply by another circuit breaker 53 whereby the program of timer 50 is delayed by a time interval corresponding to the period of energization of lead 23'. The latter lead is connected in parallel to the circuit breakers 52, 53 of all associated machines 25.

I claim:

1. A system for recovering organic solvent from a plant which includes a plurality of treatment units intermittently using such solvent during a working phase followed by a recovery phase, each treatment unit being provided with a treatment vessel and with individual switchover means establishing a closed circuit through said vessel during said working phase, said closed circuit including equipment for heating and drying the air circulating therethrough, and for connecting said vessel between an inlet manifold and an outlet manifold in said recovery phase, each treatment unit being further provided with individual circulation means for driving the solvent through said closed circuit in said working phase, said system comprising:

an incoming duct connected to said outlet manifold for receiving solvent-laden air from any treatment unit of said plant during the recovery phase thereof;

an outgoing duct connected to said inlet manifold for the delivery of substantially clean air to any treatment unit of said plant during the recovery phase thereof;

conduit means forming an air-circulating path with said ducts, said path including blower means for generating a continuous airflow traversing any treatment unit thereof which is in its recovery phase;

air-heating means at an upstream location in said path;

air-drying means at a downstream location in said path;

a pair of substantially identical adsorbers for solvent entrained by said airflow;

a regenerating circuit for said adsorbers including a source of steam;

a programmer independent of said switchover means of any treatment unit establishing a recurrent operating cycle divided into alternate active and inactive half-cycles for each adsorber;

first valve means controlled by said programmer for alternately connecting said adsorbers in said path, between said upstream and downstream locations, during respective active half-cycles thereof;

second valve means controlled by said programmer for periodically connecting each adsorber, during its inactive half-cycles, in said regenerating circuit for the retrieval of solvent accumulated in preceding half-cycles; and third valve means under the joint control of said treatment units for establishing a bypass path for said airflow from an outlet of said air-drying means to an inlet of said air-heating means whenever none of said treatment units is in its recovery phase, said bypass closing a loop through said air-heating means, the active adsorber, said air-drying means and said blower means independently of said manifolds.

2. A system as defined in claim 1 wherein said third valve means is connected to said programmer for invariable establishment of said bypass path, with concurrent blocking of a flow path through said outgoing duct to said inlet manifold plant, in said initial portion of each half-cycle.

3. A system as defined in claim 1 wherein said third valve means is provided with an operating circuit including switch means responsive to a significant pressure change in one of said ducts.

4. A system as defined in claim 3 wherein said switch means comprises a pressure sensor in an extension of said outgoing duct provided with a constriction, said pressure sensor generating a first signal in response to a relatively low pressure downstream of said constriction and a second signal in response to a relatively high pressure upstream of said constriction, said third valve means being a two-way valve connecting said outgoing duct to said extension in a first position established by said first signal and connecting said outgoing duct to said incoming duct via said bypass path in a second position established by said second signal.

5. A system as defined in claim 4 wherein said operating circuit includes an input lead from said programmer establishing said second position independently of said pressure sensor in said initial portion of each half-cycle.

6. A system as defined in claim 1 wherein said third valve means is provided with an operating circuit including switch means responsive to a timing signal from said switchover means of any treatment unit.

7. A system as defined in claim 6 wherein said third valve means is a two-way valve whose operating circuit is controlled by said timing signal for establishing a first position connecting said outgoing duct to said inlet manifold and a second position connecting said outgoing duct to said incoming duct via said bypass path, said operating circuit including an input lead from said programmer establishing said second position independently of said timing signal in said initial portion of each half-cycle.

8. A system as defined in claim 1 wherein said adsorbers are each provided with an inlet port and an outlet port, said first valve means comprising a pair of ganged switchover valves for alternately admitting air from said air-heating means to said inlet ports and for alternately discharging air from said outlet ports to said air-drying means.

9. A system as defined in claim 8 wherein said adsorbers comprise respective housings with confronting sides carrying said inlet and outlet ports, said switchover valves being disposed between said housings and forming a structural unit with said ports.

10. A system as defined in claim 1 wherein said regenerating circuit includes a condenser and a water separator, said air-drying means being provided with a drain leading to said water separator.

11. A system as defined in claim 1 wherein said air-heating means and said air-drying means are normally inactive, further comprising energy-supply means controlled by said programmer for activating said air-heating means and said air-drying means during an initial period of each half-cycle to expel residual moisture from the adsorber regenerated in the previous half-cycle.

* * * * *